United States Patent [19]
Eizenhöfer et al.

[11] Patent Number: 5,933,114
[45] Date of Patent: Aug. 3, 1999

[54] PROCESS AND APPARATUS FOR LOCATING MOBILE STATIONS

[75] Inventors: Alfons Eizenhöfer, Altdorf; Reinhold Mertens, Lauf a.d. Pegnitz, both of Germany

[73] Assignee: Detemobil Deutsche Telekom Mobilnet GmbH, Bonn, Germany

[21] Appl. No.: 08/702,564

[22] PCT Filed: Mar. 6, 1995

[86] PCT No.: PCT/DE95/00293

§ 371 Date: Sep. 12, 1996

§ 102(e) Date: Sep. 12, 1996

[87] PCT Pub. No.: WO95/25410

PCT Pub. Date: Sep. 21, 1995

[30] Foreign Application Priority Data

Mar. 16, 1994 [DE] Germany .............................. 44 08 953

[51] Int. Cl.[6] ....................................................... G01S 3/02
[52] U.S. Cl. ............................ 342/457; 340/928; 455/456
[58] Field of Search ..................................... 342/450, 451, 342/463, 464; 340/928, 905

[56] References Cited

U.S. PATENT DOCUMENTS

| | | | |
|---|---|---|---|
| 4,541,119 | 9/1985 | Cooper et al. | 340/905 |
| 5,230,081 | 7/1993 | Yamada et al. | 379/59 |
| 5,295,180 | 3/1994 | Vendetti et al. | 379/59 |
| 5,404,376 | 4/1995 | Dent | 342/450 |
| 5,444,742 | 8/1995 | Grabow et al. | 340/905 |

FOREIGN PATENT DOCUMENTS

| | | |
|---|---|---|
| 0058596 | 8/1982 | European Pat. Off. . |
| 0240051 | 10/1987 | European Pat. Off. . |
| 2247128 | 2/1992 | United Kingdom . |
| 9202104 | 2/1992 | WIPO . |

OTHER PUBLICATIONS

NTZ "Zukünftige automatische Gebührenerfassung für den Straßenverkehhr" [Future Automatic Toll Recording for Road Traffic]; vol. 46, No. 4 (1993).
VDI Nachrichten [VDI Reports] Aug. 20, 1993 pp. 2–3.
Patent Abstracts of Japan, vol. 16, No. 199 (P–1351) May 1992 and JP 04 030298 (Nissin Electric Co. Ltd.) of Feb. 1992.

*Primary Examiner*—Gregory C. Issing
*Attorney, Agent, or Firm*—Greenblum & Bernstein P.L.C.

[57] ABSTRACT

Process and apparatus for locating mobile stations in a cellular mobile radio network. The apparatus may include a plurality of radio cells in which each radio cell is supplied by at least one base station, a plurality of transmitters in which each of the plurality of transmitters establish a locally defined underlay broadcast cell, the plurality of transmitters being located within at least one of the plurality of radio cells, a signal receiving and evaluating device associated with a respective mobile station that receives signals from the plurality of radio cells and the plurality of transmitters, information comparing units associated with the respective mobile station that compare information about one of the plurality of underlay broadcast cells received from a corresponding base station of the mobile radio network and information about the locally defined underlay broadcast cell received from one of the plurality of transmitters, a position determination device, and a device that forwards information about the locally defined underlay broadcast cell from the one transmitter to the position determination device when the compared information agree. The process may include emitting an underlay broadcast cell from the base stations of the mobile radio network, receiving, at the mobile stations, information about the underlay broadcast cell emitted from a corresponding base station of the mobile radio network, receiving, at the mobile stations, information about the locally defined underlay broadcast cell emitted from the transmitter, comparing the information received at the mobile stations from the corresponding base station and the transmitter, and determining a position of the mobile stations with the information received from the transmitter if the compared information agree.

16 Claims, 8 Drawing Sheets

FIG. 6.1
4.615ms
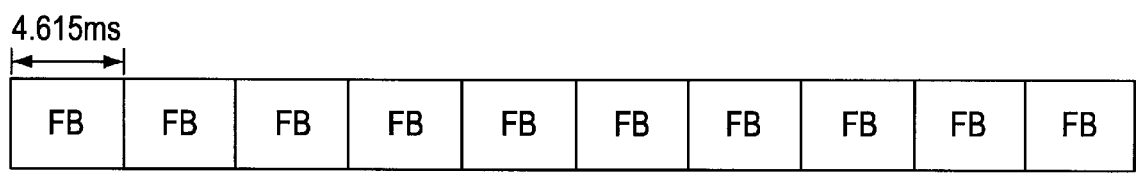
FIG. 6.2
4.615ms
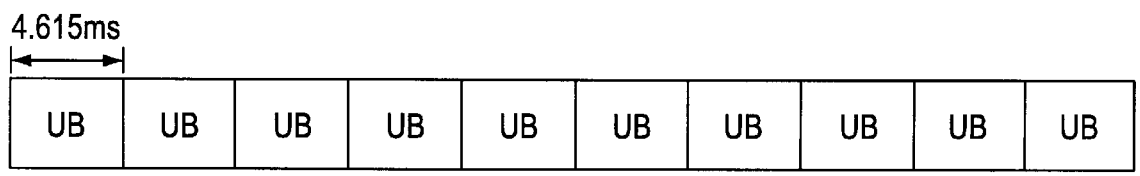
FIG. 6.3
1 FRAME = 4.615ms
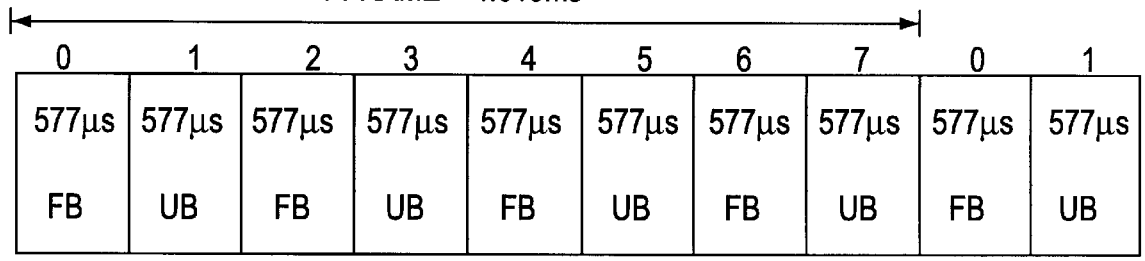

FIG. 7

| 8 | 7 | 6 | 5 | 4 | 3 | 2 | 1 |
|---|---|---|---|---|---|---|---|
| BSIC | | | | | | T1 (HIGH) | |
| T1 (MIDDLE) | | | | | | | |
| TI (LOW) | | T2 | | | | T3'(HIGH) | |
| | | | | | | | T3' (LOW) |

FIG. 8

| 8 | 7 | 6 | 5 | 4 | 3 | 2 | 1 |
|---|---|---|---|---|---|---|---|
| TRIGGER POINT IDENTITY (HIGH) | | | | | | | |
| TRIGGER POINT IDENTITY (LOW) | | | | | | | |
| UBC NUMBER | | | 0 | 0 | 0 | 0 | 0 |
| | | | | | | | CONTROL |

PROCESS AND APPARATUS FOR LOCATING MOBILE STATIONS

BACKGROUND OF THE INVENTION

The invention relates to a process for locating mobile stations in a cellular mobile radio network.

Various processes have been disclosed for charging usage fees (tolls) for roads and highways. Until now, though, the only method used widely has been tollbooths where cars stop and after payment of the toll, are permitted to drive the toll road. This leads to traffic jams on heavily travelled roads, despite a multitude of individual payment stations. Even devices where the driver slows down and throws a coin into a basket bring only limited relief.

Furthermore, processes have been disclosed for automatically ascertaining and debiting usage fees. In the process described in NTZ, Vol. 46 (1993), No. 4 "Zukünftige automatische Gebührenerfassung für den StraBenverkehr" [Future Automatic Toll Recording for Road Traffic], toll charging points are equipped with devices in which a communication takes place between the charging point and the vehicle.

In systems of this kind, position determination, namely determining whether a car is passing a toll charging point or is on a toll road, is of considerable significance. Beacon systems using infrared or microwaves have been disclosed for position determination. A radio transmission is used exclusively for position determination. In systems of this kind, often considerable structural measures are required.

A detection system described in VDI-Nachrichten [VDI Reports] dated Aug. 20, 1997, pages 2 to 3 uses a position determination of the vehicle with the aid of the GPS system (global positioning system), with which a position determination is carried out using satellites. Apart from the GPS system possibly not being precise enough for the purposes of charging tolls, a position determination with the aid of the GPS system requires an additional expenditure in vehicles.

OBJECT AND SUMMARY OF THE INVENTION

The object of the present invention is to reliably carry out a position determination of mobile stations, and thus of vehicles, with as low as possible an expenditure on infrastructure and vehicular devices.

This object is attained according to the invention by virtue of the fact that in addition to the position determination functions within the mobile radio network, the mobile stations evaluate signals from transmitters, each of which forms a locally defined trigger cell (underlay broadcast cell).

An advantage of the invention is comprised in that an already existing mobile radio network simultaneously fulfills the function of position determination. The process according to the invention can advantageously be used together with the GSM network, but using it in cellular mobile radio networks with other specifications is not precluded. On the infrastructure end, the process according to the invention requires only simple transmitters on the edges of the road, in particular, the highway. As a result, considerable infrastructure costs are saved. In the vehicle, the mobile station is broadened by a few software functions that permit it, for example, to call at the same time as carrying out position determination. Mobile stations are mass produced cheaply, which is also easily possible for the mobile stations which are broadened to carry out the process according to the invention. Mobile stations can also be used, which are designed not for calling, but exclusively for position determination, wherein the expenditure required for calling is no longer necessary.

In the GSM network, the range is not critical and the transmission process is designed for vehicle speeds of over 300 km/h. Consequently, a network for charging highway tolls can be constructed in accordance with the process according to the invention.

An improvement of the process according to the invention is comprised in that the frequencies of the trigger cells are communicated to the mobile stations through the mobile radio network using the broadcast process. In this connection, the ability of a cellular mobile radio network to associate a mobile station with a respective cell and thus to approximately determine the respective location of the mobile station can be used in an advantageous manner. In this improvement, the mobile station no longer needs to search all frequencies used in the detection range for trigger cells.

In a different improvement of the process according to the invention, it is provided that the mobile stations compare data emitted by the associated transmitter for the individual trigger cell with data about the trigger cells that is emitted in the mobile radio network, and that the data of the trigger cell is only used for position determination if the sets of data agree. As a result, the reliability of the position determination is significantly improved.

An advantageous embodiment of the process according to the invention is comprised in that to determine position, the mobile stations evaluate the field intensity of each trigger cell. Preferably, the mobile stations distinguish between at least two field intensity levels of the trigger cell.

Provided that it should be suitable to designate various field intensity levels for the individual trigger cells, it is advantageous if the relevant field intensity level(s) for the trigger cell(s) can be communicated through the mobile radio network using the broadcast process.

An advantageous embodiment of the process according to the invention is characterized in that the mobile stations regularly scan the frequencies of trigger cells and that one of the frequencies is scanned more often as soon as the receiver input level exceeds a first predetermined field intensity level.

In this embodiment, it is assured on the one hand that the frequencies of trigger cells, which are communicated by the mobile radio network and which the vehicle is possibly approaching, are scanned sufficiently often. On the other hand, in the region of a trigger cell, the frequency of this trigger cell is scanned often enough to permit an evaluation of the received data within a short space of time that this region is being driven through. A further advantageous embodiment of the invention leads to a precise position determination by virtue of the fact that the mobile station regularly scans the frequencies of trigger cells and that the data received is evaluated when the receiver input level exceeds a predetermined field intensity level.

An increase in the reliability of position determination as well as the obtaining of directional data can be achieved by dint of the fact that the results of the evaluation of signals from a number of transmitters (trigger cells) can be associated with one another.

A considerable contribution is made to simplifying the mobile stations if the transmitters of the trigger cells emit signals that are comprised of individual bursts, which correspond to the physical plane in the GSM standard. Preferably, it is provided that alternating frequency correction bursts (FB) and data bursts (UBB) are transmitted.

An improvement of the invention is comprised in that the signals emitted by the transmitters contain an identification of a definite charging point for a toll charge. This permits a perfect position determination. In the case of a charging point made up of a number of trigger cells, in order to permit a corresponding evaluation in the mobile stations, it can be provided that for the case in which a number of trigger cells constitute a charging point for highway usage fees, the signals emitted by the transmitters furthermore contain a number of the respective trigger cell with regard to its affiliation with the charging point.

Charging usage fees for highways generally also requires a control as to whether the vehicles using the highway have previously been charged a toll. Various processes have been disclosed for this, among other things, those in which vehicles that are legally using the highway emit suitable signals. When the process according to the invention is carried out, it can be advantageous for this that the signals of the transmitter each contain data as to whether a monitoring with regard to a toll charge is being carried out at the respective charging point.

In order to prevent errors in charging of tolls, among other things it must be distinguished as to whether a vehicle is travelling on a toll road or on a road that parallels it in the immediate vicinity. This can occur with the aid of a device for carrying out the process according to the invention by virtue of the fact that the transmitters of two trigger cells that constitute a charging point are disposed on opposite sides of the highway.

If need be, the process according to the invention can also be combined with other processes for position determination, for example with the use of the GPS. Furthermore, it is not limited to a position determination for the charging of highway tolls, but can also be used for other purposes that require a position determination.

Details of the mobile radio network according to GSM recommendations (called the GSM network below) are described in the GSM technical specification 05.01 of the European Telecommunications Standards Institute (ETSI) Version 4.0.1, October 1992, and the GSM recommendations 05.02 to 05.10.

A few more advantages and options of the process according to the invention are indicated below:
1. Normal GSM operation:
Position determination occurs parallel to the normal GSM operation and does not interfere with this in any way. In particular, position determination is also possible during a call.
2. Operator independence:
Position determination is possible for all mobile stations. This is true for subscribers to an arbitrary GSM network, but is also true for mobile stations that are not associated with any GSM network.
3. Accuracy to within 20 m:
The precision is a function of the speed. At a speed of 250 km/h, the accuracy is to within approximately 20 m. In the position region, the precision is merely a function of the aerial radiation characteristic.
4. Effective range:
Position determination can only take place at points where there is a trigger cell. Therefore position determination is not continuous and does not cover all areas.
5. Travel direction recognition
It is possible to recognize the direction of travel by means of double triggering (two trigger cells at one charging point).
6. Frequency requirement
The frequency requirement is very low and can be adapted favorably to an existing radio network plan. All trigger cells could use the same frequency.

Remote servicing and monitoring of the transmitters associated with the trigger cells without cable connection is possible according to an advantageous apparatus for carrying out the process according to the invention because the associated transmitter is connected to a send/receive device that functionally corresponds to a mobile station inside a mobile radio network and transmits data to and from a service and operation device (OMC).

If in the individual case, the advantages connected with the use of the mobile radio network were to be eliminated, then a position determination of a vehicle that is on a highway can also occur merely by virtue of the fact that signals from transmitters directed at sections of the highway are received by receivers disposed in the vehicles, wherein the signals contain data for identifying the respective transmitter, that a position determination only occurs if signals of two transmitters that are associated with each other are received and that the transmitters associated with each other are disposed on both sides of the highway.

This apparatus has the advantage that position determinations are not carried out on vehicles on other roadways that parallel the highway. A simple recognition of the direction of travel is possible because the transmitters associated with each other are disposed offset from each other in the direction of travel.

Exemplary embodiments of the invention are represented in the drawings of several Figs. and are explained in detail in the description below:

BRIEF DESCRIPTION OF THE DRAWINGS

FIG. 7 shows the structure of a synchronization channel according to GSM recommendations, FIG. 8 shows the structure of a channel of the trigger cell.

Figure 1:
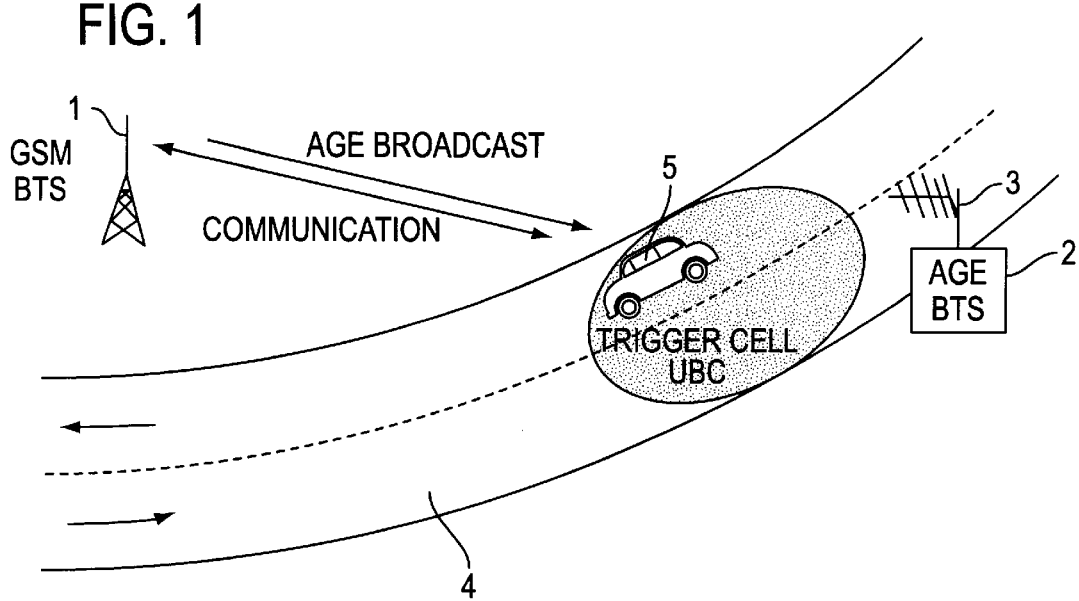
FIG. 1 is a schematic representation of a first apparatus for carrying out the process according to the invention.

In the FIGS., the same parts are labeled with the same reference numerals. In the literature, various abbreviations are used to identify different signals and components of the GSM network, of which some are explained below in conjunction with the usual English descriptions used for them in the field.
AGCH Access Grant Channel
BA Base Station Allocation
BCCH Broadcast Control Channel
BSIC Base Station Identity Code
DCCH Dedicated Control Channel
FB Frequency Correction Bursts
FCCH Frequency Correction Channel GPRS General Packet Radio Service
MS Mobile Station
MSC Mobile Services Switching Center
PCH Paging Channel
RFC Reduced TDMA Frame Number
S cell Serving Cell; radio cell from the normal GSM network
SACCH Slow Associated Control Channel
SCH Synchronization Channel
SMSCB Short Message Service Cell Broadcast Furthermore, the following abbreviations are used in connection with the invention:
AGE German acronym for "highway toll charging"
UB Underlay Broadcast Burst
UBC Underlay Broadcast Cell
UBCH Underlay Broadcast Channel

DESCRIPTION OF THE PREFERRED EMBODIMENTS

Means for Carrying out the Process

In the exemplary embodiment in FIG. 1, three components are used to carry out the process according to the invention, namely:
  the GSM network, which is represented in FIG. 1 by a base station 1 (GSM-BTS),
  a trigger cell, that is, the transmission range of a base station 2 (AGE-BTS), whose antenna 3 is directed at a road 4, and
  a mobile station that is disposed in a motor vehicle 5.

The GSM network component is the public GSM network. For position determination, it is not necessary to be a participant in a GSM network. The mobile station merely requires data about the frequency of the trigger cell. Position determination can also occur without the GSM network. In this case, though, a previous knowledge of the UBC frequencies is required.

In the GSM definition, the serving cell or S cell is the radio cell from the GSM mobile radio network of an arbitrary network operator, which has associated with the mobile station. In connection with AGE, the cell or cells of the GSM network are described as S cells in whose range the UBC lies. Position, size, and traffic capacity of the S cells are insignificant for position determination using UBCS. No demands whatsoever are placed on the S cells (location, frequency, cell radius, . . . ), with the exception that an AGE broadcast channel be furnished. All affected network operators must furnish the AGE broadcast channel in order for position determination of mobile stations from various GSM networks to be carried out. The AGE broadcast channel can be embodied in the form of the cell broadcast channel CBCH for the short message service cell broadcast SMSCB. There are, however, also other options, e.g. the broadcast service of the new packet data service GPRS.

On the AGE broadcast channel, data is sent which can be divided into two groups, data for rapid discovery of the UBC and data for the user:

The UBC data is the UBC frequency, the minimal receiver input level, and the identity of the charging point. user data is toll data, traffic information, and other information from the company operating the highway.

The UBC data is required for position determination, the user data is optional. Depending upon setup of the system, the toll data can be required for the debiting of tolls, but they are unimportant for position determination. Furthermore, in the event that communication is required between the AGE unit in the vehicle and the network, for example for control purposes, then this is carried out via the S cell.

The trigger cell component (underlay broadcast cell UBC) is formed so that it supplies only the roadway at the charging point. It is merely comprised of a weak transmitter 2 (FIG. 1) that emits the trigger signal. Most functions of a GSM-BTS, such as frequency hopping, power control, ciphering, user information channels, voice encoding, data services, hand-over, paging, etc. are not required. Even the entire AbiS interface is not needed since the trigger cell does not require any connection to the GSM network. The power output of the transmitting output stage is very small (under 1 watt) since the range is limited and moreover, directional antennae are used. The BTS in the trigger cell is therefore very simple and reasonably priced.

Figure 3:
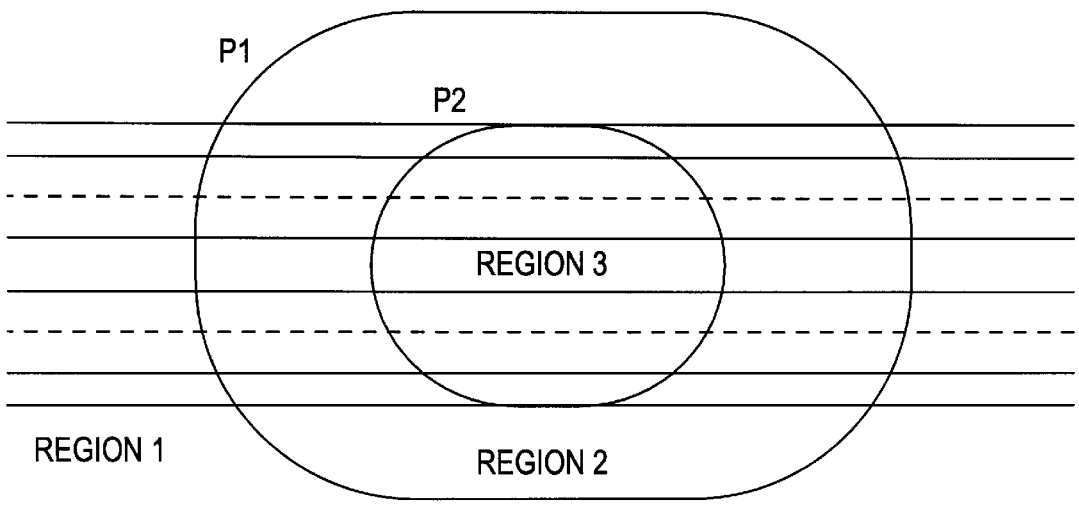
FIG. 3 is a block circuit diagram of a vehicular device.

In order for the triggering process to occur very rapidly and reliably, the trigger cell is divided into three regions (FIG. 3).
Region 1: outside the trigger cell, where receiver input level UBC-RX<P1;
Region 2: reading range, where P1<receiver input level UBC-Rx <P2; Region 3: triggering range, where P2<receiver input level UBC-Rx.

Figure 2:
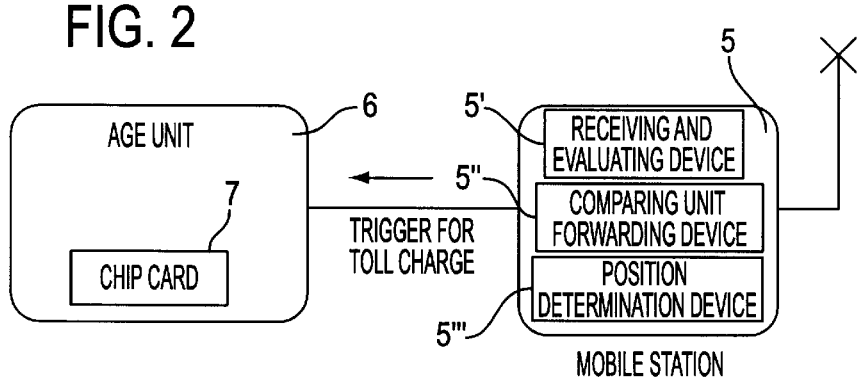
FIG. 2 is a schematic representation of a trigger cell.

The vehicle is equipped with a modified GSM mobile station 5 (FIG. 2) and the AGE unit 6. Modified GSM mobile station 5 includes a receiving and evaluating device 5', a comparing unit/forwarding device 5", and a position determination device 5'''. The mobile station is a normal GSM. mobile station, or an inexpensive AGE mobile station without display, keypad, earphone, microphone, etc. In any case, it is broadened by the additional AGE functions. Thus, the mobile station has an interface to the AGE unit and software to read the AGE broadcast channel and to correspondingly react to it. It is furthermore able to more rapidly execute the search for adjacent cells than mobile stations that have to be frugal with battery energy. If the mobile station passes through the trigger cell, it receives the signal of the UBC and releases the trigger in the AGE unit, which leads to a debiting of charges on the chip card 7.

Figure 4:
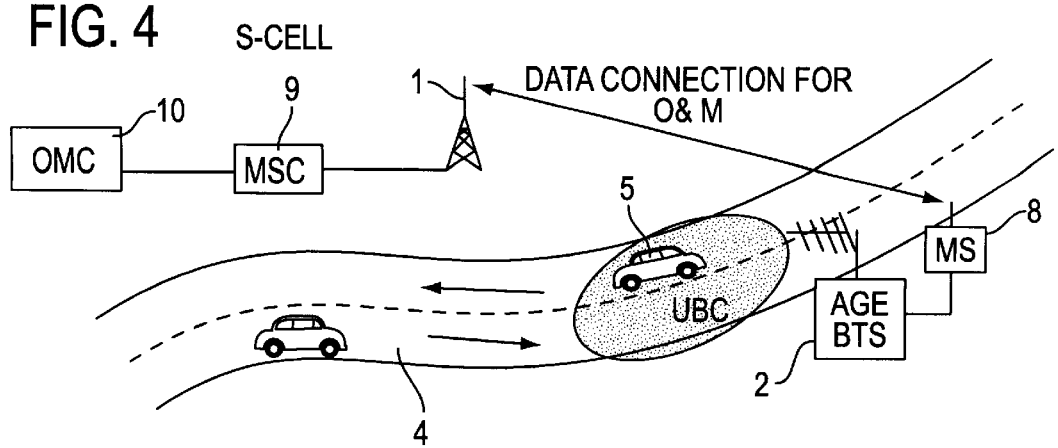
FIG. 4 shows another exemplary embodiment of an apparatus for carrying out the process according to the invention.

Operation and service of the S cell and the mobile station in the vehicle takes place in accordance with the agreements in effect in the individual GSM networks. As a rule, though, the BTS of the trigger cell has no connection to a communication network. However, monitoring functions are required. To this end, the BTS 2 of the trigger cell is equipped with a normal mobile station 8 (FIG. 4). Via this, a data connection with an operation & maintenance central station 10 can be produced as needed via the base station 1 and the switching system 9 of the GSM network. It should be emphasized that the data of the trigger cell does not have to be changed practically ever since all important data is emitted via the S cell.

Mode of Operation

The process according to the invention is described below in conjunction with the actions of the mobile station with reference to FIG. 3.

The mobile station receives the AGE broadcast signal emitted by the S cell, stores the UBC data, and transmits the user data to the indicator. The actual toll is already indicated to the subscriber before he drives the next section of road. In this manner, when there are dynamic tolls, that is ones which change depending on what time it is, the subscriber has the option of actually deciding whether or not to use the highway. The reading of the AGE broadcast channel happens at the very least whenever the mobile station associates with a new S cell. If the mobile station is in call mode, then the UBC data is sent to it via the AGCH of the S cell.

The mobile station knows the frequencies of the trigger cells from the AGE broadcast channel and constantly scans these frequencies in region 1, i.e. outside the trigger cell. In order to receive as many scanning values as possible, no more than 10 different trigger frequencies should be used. Already for radio network planning reasons, in the vicinity of an S cell, the same frequency is used for all trigger cells, if possible. Every 120 ms, the mobile station produces the average value via the measurement values of the last 240 ms and in this way, obtains the value UBC-Rx.

If the mobile station is in region 2 of a trigger cell, i.e. the receiver input level UBC-Rx has exceeded the value P1, the scan rate for the actual trigger cell is increased to at least 10 scans in 120 ms. The scanning of the other trigger frequencies can be simultaneously lowered to one scan per 120 ms. The mobile station continuously produces the average value via the measurement values of the last 120 ms and in this way, obtains the value UBC-Rx.

If a trigger frequency with a field intensity of UBC-RX>P1 is discovered, then the mobile station attempts to read the signal. To that end, it receives the frequency correction burst FB on the frequency correction channel FCCH and the underlay broadcast burst UB on the underlay broadcast channel UBCH. In order to check the multiplex format of the UBC, it must receive both the FB and the UB at least twice so that a confusion of the FB with the SCH on a BCCH is prevented. This takes place for example through reception in different time slots.

The mobile station decodes the signal of the trigger cell and compares the information with the data that has been emitted by the AGE broadcast channel. This data comparison is necessary in order on the one hand to be able to differentiate between trigger cells in the event that several of them use the same frequency and on the other hand to be able to definitely distinguish GSM cells from trigger cells. The mobile station measures the receiver input level of the trigger cell further and periodically decodes the data of the trigger cell again every few seconds.

If the field intensity UBC-Rx of the trigger cell exceeds the level P2, i.e. UBC-Rx>P2, and if the other criteria (multiplex format, charging point identity, multiple triggering) are correct, the mobile station transmits a signal to the AGE unit. The toll charge is carried out there. The releasing of the trigger is now blocked until the field intensity of the trigger cell in which the last debit was made has fallen below the value P1 or another trigger cell has been found.

Multiple Triggering

The form of the trigger cells is adapted to the highway. Nevertheless, it cannot be avoided that these are received with low field intensity on neighboring roads as well. In order to increase reliability, the position of trigger cells must be carefully planned. Sections of highway which are not paralleled or crossed by other roads are preferable. Clefts and sound barrier walls ease the formation of trigger cells considerably. In critical situations, multiple triggering can ensure the required reliability.

Multiple triggering permits the prevention of false triggerings, i.e. incorrect toll charges. It also permits travel direction recognition and hence, a direction-dependent charging of tolls.

In multiple triggering, the mobile station must pass through two or more given trigger cells. The number of trigger cells that belong to the same charging point is emitted by the serving cell on the AGE broadcast channel. The triggering conditions (e.g. field intensity P2) must be fulfilled for each individual trigger cell. The trigger mode ensues, which is transmitted on the AGE broadcast channel and indicates in which instance the triggering, i.e. the charging of the toll, is carried out. This happens in the following instances, for example:

1. All n trigger cells have been recognized.
2. One of the n trigger cells has been recognized.
3. m of n trigger cells have been recognized (1<m<n).
4. Case 1 or 3 was true and the field intensity level of the one or more trigger frequencies between the trigger cells did not fall below a certain level.
5. One of cases 1 to 4 was true and the trigger cells were found within a limited time.

The trigger cells belonging to a charging point can use the same frequency or also different frequencies. For the triggering in the mobile station, it is only important that the cells belong to the same charging point. The cells can be distinguished by their UBC number.

With multiple triggering, the direction of travel can be recognized from the order in which the cells are driven through. This is possible not only on simple stretches of road, but even at highway interchanges. The two types of triggering "simple triggering" and "multiple triggering" can be used combined in the same network.

Figure 5:
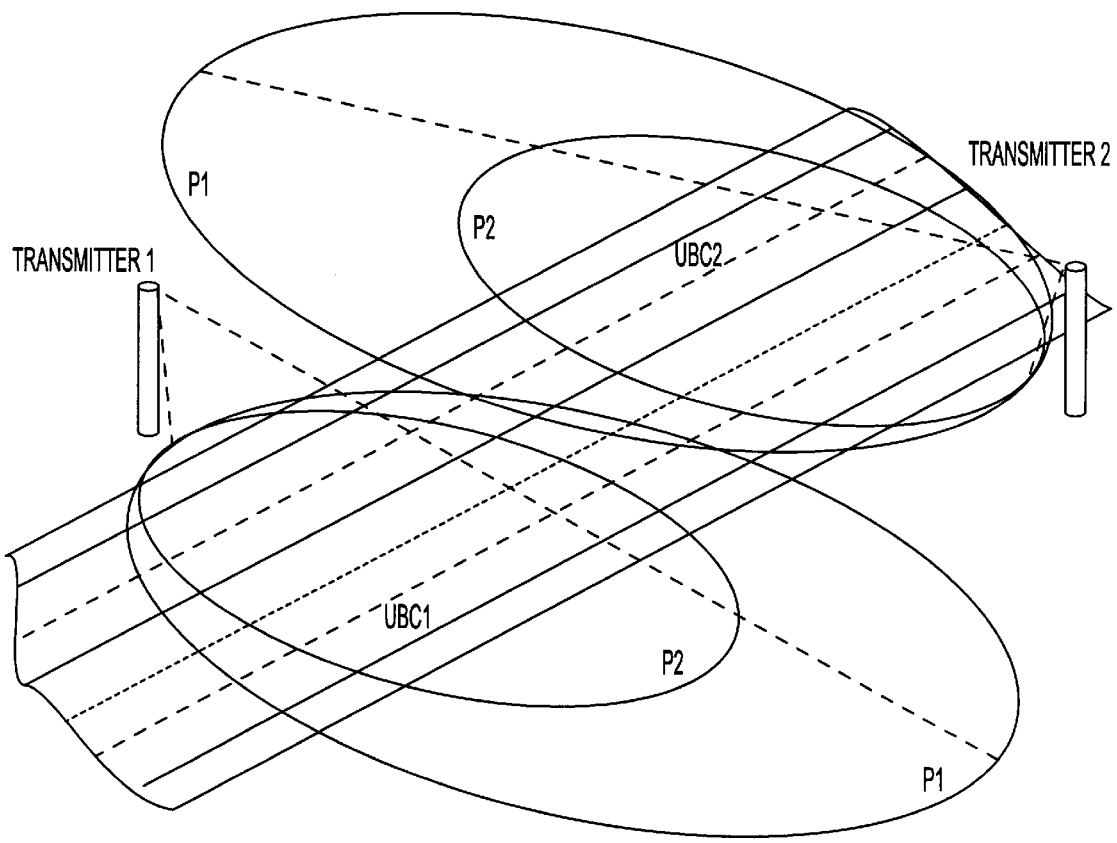
FIG. 5 shows a charging point with two trigger cells, FIGS. 6.1–6.3 shows schematic representations of the signals emitted by the transmitter of the trigger cell.

Multiple triggering makes it possible to produce smaller cells. FIG. 5 shows an example of this. Even if the critical region P2 reaches beyond the roadway, a false triggering is not possible since both UBC1 and UBC2 have to be received.

Criteria for Toll Debiting

Toll debiting requires a number of criteria that prevent an incorrect debiting. All of the criteria described below must be fulfilled.

1. Frequency criterion
The information as to which frequencies trigger cells transmit their signals on is transmitted by the surrounding GSM cells on the AGE broadcast channel. The mobile station checks only these frequencies for field intensity. Other GSM frequencies are not consulted for the AGE triggering.
2. Field intensity criterion
The minimum field intensity value P2 with which the signal of the trigger cell must be received is emitted by the surrounding GSM cells (S cells). The trigger is released only if the trigger cell is received with at least the field intensity P2.
3. Synchronization criterion
The trigger cells transmit a signal that has a different channel structure than the GSM channels. It is selected so that normal GSM mobile stations cannot synchronize on the trigger cell. AGE mobile stations recognize the multiplex structure of trigger cells and check these in the synchronization process. The received signal is accepted as a trigger signal only if the synchronization is successful.
4. UBC identity criterion
The mobile station decodes the identity of the charging point from the signal of the trigger cell. The trigger cell is accepted only if this identity agrees with the one that has been received on the AGE broadcast channel.
5. Multiple triggering criterion In multiple triggering, the respective criterion prescribed by the trigger mode must be fulfilled. Possibly a number of cells must be received before the trigger is released.

Structure of the Trigger Signal

The trigger cell is comprised of a transmitter that emits signals which physically correspond to GSM recommendations. Modulation, band width, channel coding, the burst structure, and the time multiplex factor of 8 are identical with the GSM specifications. This makes it easier to implement the AGE specific functions in conventional GSM mobile stations.

However, there are only two logical channels in the trigger cell, the frequency correction channel FCCH and the underlay broadcast channel UBCH. The FCCH is transmitted in time slots 0, 2, 4, and 6 (FIG. 6.1) and the UBCH is transmitted in time slots 1, 3, 5, and 7 (FIG. 6.2). The time slots are not structured per se, i.e. there is no multiframe. Frequency correction bursts FB or underlay broadcast bursts UB are transmitted continuously.

The pattern shown in FIG. 6.3, in which FB and UB alternate, is produced on the burst plane as a result of the multiplex structure selected.

A GSM mobile station without AGE function, which takes the trigger cell for a GSM cell and attempts to enter this cell, first seeks the FCCH. It finds the frequency correction burst and takes this time slot for the zero time slot. Then it attempts to decode the SCH in the same time slot. But since only frequency correction bursts are transmitted in the time slot found, it cannot decode the channel and strikes the carrier off its list in accordance with GSM recommendation 05.06. It selects a new frequency and attempts the process again.

The frequency correction burst FB corresponds to the specifications according to GSM recommendation 05.02, chapter 5.2.4. The underlay broadcast burst UB is constructed like the synchronization burst (SB) according to GSM recommendation 05.02, chapter 5.2.5. The channel coding of the UBCH likewise corresponds to the coding of the synchronization channel SCH, see GSM recommendation 05.03, chapter 4.6. Only the information content is different than on the SCH.

The information content of the UBCH differs from that of the synchronization channel SCH. The SCH communication is described in GSM recommendation 04.08, chapter 9.1.2.28. The information fields of the SCH are shown in FIG. 7. They are redefined for the UBCH in FIG. 6.2.

The information fields are the trigger point identity, the UBC number, and the control bit, whose significance is explained below.

The trigger point identity is the clear identity of the charging point within a country. Together with the country code number that is transmitted on the AGE broadcast channel, the charging point is unique throughout the world. There are 65,536 possible charging points in one country.

The trigger cells of a charging point are consecutively numbered. The UBC number indicates the number of the actual trigger cell. It is only important in multiple triggering. There are up to 8 possible UBCs per charging point.

The control bit indicates whether there is monitoring at this charging point. If the bit is "0" there is none, if the bit is "1", then a monitoring occurs.

AGE Broadcast Channel

The AGE broadcast channel transmits 2 kinds of data. The first, the UBC data, is designated for the mobile station and is absolutely required for the triggering process. The second kind of data, the user data, is designated for the driver. With the exception of the toll data, it is not absolutely required for position determination.

The data that is required for the recognition of a trigger cell and the triggering of the toll debit (UBC data) is listed below:

Frequency of the UBC
  The mobile station must know the frequency of the UBC so that it can search for it a prioritized manner. This previous knowledge considerably accelerates the search for trigger cells.
Minimal receiver input levels P1 and P2
  If a trigger cell is received with at least the receiver input level P1, then the mobile station reads the data on the UBCH. If the receiver input level exceeds P2, then the toll debiting is triggered.
Identity of the charging point
  The identity of the charging point is also transmitted by the trigger cell on the UBCH. The mobile station compares these sets of data.
Number of trigger cells at the charging point
  The number of trigger cells at the charging point is important for multiple triggering.
Trigger mode
  The trigger mode indicates when the triggering of the toll debit occurs in multiple triggering.
Toll data
  Toll data is important for the AGE device that must apply this toll in the toll debiting. This data can be different for each trigger cell that lies in the wider range of the GSM cell.

User data is information about the operator of the charging point and toll data. The toll data is important for the user so that he knows the actual toll for driving the road. Furthermore, the user data can contain traffic information and other information from the company operating the highway, which is of interest to the user, but not significant to the system. This data is optional. It can differ from cell to cell.

For position determination, the mobile station requires the UBC data of the AGE broadcast channel. But it can only receive this in idle mode, i.e. if it is not connected to the network. For example if there is a call connection, then the mobile station cannot listen to the AGE broadcast channel. In order to assure that the mobile station continuously receives the actual data, the UBC data of the AGE broadcast channel is transmitted to it by means of signaling over the SACCH.

At least after every cell change (hand-over), the mobile station has to receive the actual data of the AGE broadcast channel. The user data is not required for position determination, but might likewise have to be transmitted to the subscriber during a call, possibly for other reasons.

Mobile Station

The mobile station has the task of rapidly recognizing the trigger cell and not neglecting the other GSM tasks. This task is made easier for it by the following measures:
1. Prior knowledge about the frequencies of trigger cells.
2. As few trigger frequencies as possible, i.e. if possible, the trigger cells all transmit on the same frequency.
3. Frequent transmission of frequency correction bursts FB.
4. Frequent transmission of underlay broadcast bursts UB.

The frequencies of adjacent cells in the GSM network are transmitted in the BA list on the BCCH, while the frequencies of trigger cells are transmitted on the AGE broadcast channel.

There are two reasons for this measure: GSM mobile stations without AGR do not try to receive the trigger cells and AGE mobile stations can distinguish trigger cells from adjacent GSM cells and deal with them in a prioritized manner.

The mobile station is in idle mode when it is not maintaining an active connection with the network. In particular, it does not occupy any radio channel and as a result, has sufficient time for the recognition of trigger cells. It can carry out the scanning of frequencies (monitoring) for the GSM cells according to GSM recommendation 05.06, i.e. these frequencies are scanned relatively rarely. Enough time remains to measure the field intensity of trigger frequencies often, e.g. one measurement in each TDMA frame of 4.615 ms.

Figure 9:
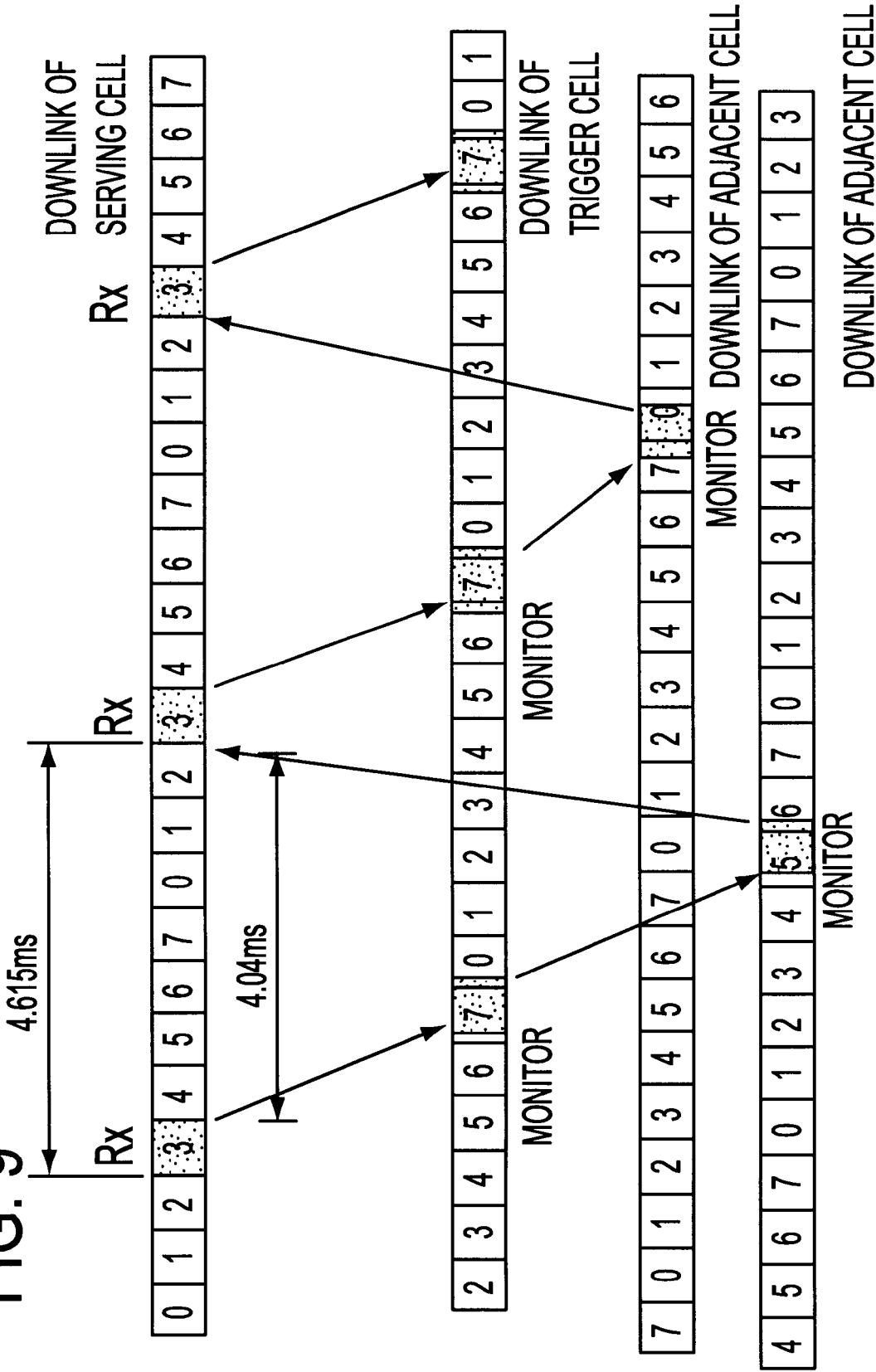
FIG. 9 is a diagram to explain the scanning of various frequencies by a mobile station in idle mode.

At most, there are bottlenecks at the point when the channels PCH or AGCH are listened to. Since the mobile station does not have to transmit at this point, it can easily measure the field intensity of two different frequencies within one TDMA frame. FIG. 9 shows an example in which a trigger frequency and a GSM-BCCH frequency are alternatingly scanned. It is even possible to scan more than 2 frequencies in the reception pause of 4.04 ms.

Two field intensity measurements per frame of 4.615 ms produces 433 field intensity measurements per second. If one assumes that several field intensity values have to be averaged, then in idle mode, the mobile station can very reliably discover the carrier of a trigger cell within 100 ms.

The mobile station is in connected mode when it is maintaining an active connection with the network, in this case with the S cell, and exchanges data over a TCH, for example. In this state, the greatest demands are placed on the mobile station with regard to the measurement of the received power on frequencies of adjacent cells and trigger cells (monitoring) (FIG. 10).

Figure 10:
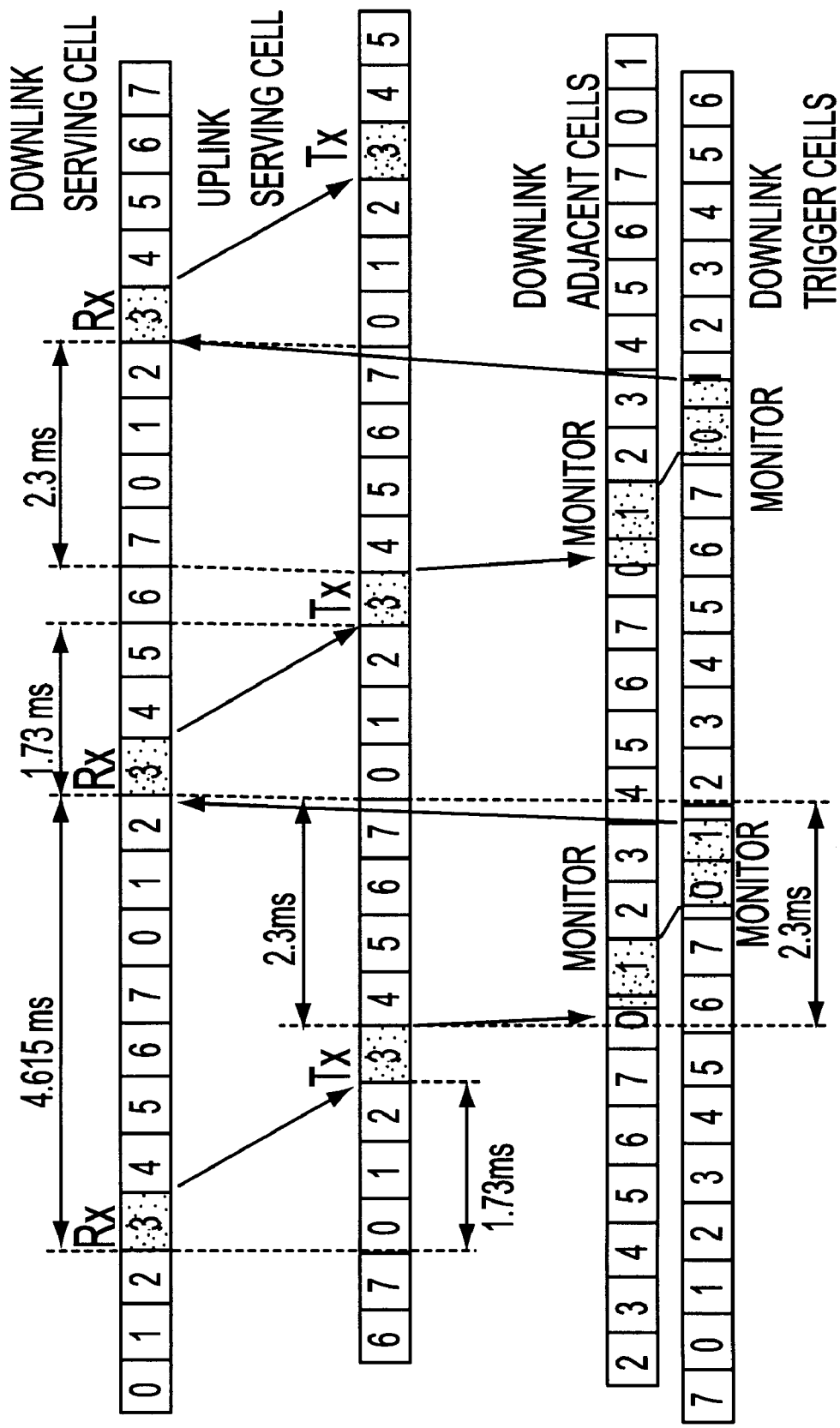
FIG. 10 is a diagram to explain the scanning of various frequencies by the mobile station in send/receive mode.

In connected mode, the scanning (monitoring) of adjacent cells must be carried out between the transmission and the reception on separate channels (Tx and Rx in FIG. 10). Within this time, which is 2.3 ms, two field intensity measurements can be carried out. At the same time, the frequency must be retuned three times within 2.3 ms. With a tuning time for the frequency synthesizer of approximately 0.1 ms, two times 1 ms of measuring time remains, which is quite sufficient at the channel band width of 270 kHz. One of the two frequency scans is reserved for trigger cells and the other is reserved for adjacent GSM cells. P26 scans for trigger frequencies and adjacent GSM cells are produced per multiframe of 120 ms. If one takes into account that the empty time slot (see idle time slot GSM rec. 05.02) is required for reading the SCH of adjacent GSM cells, the scans immediately before and after are no longer necessary. There are 24 remaining scans of trigger frequencies in 120 ms. Depending on the time slot, this produces 19 to 21 scans per 100 ms. It is thus also possible in connected mode to reliably recognize a trigger cell within 100 ms.

For the recognition of trigger cells, on the one hand, possibly a number of frequencies must be scanned and on the other hand, a number of scanning values have to be averaged for a reliable determination. If the recognition of a trigger cell is to be carried out reliably and extremely quickly, then particular steps must be taken in order to be able to use as many as possible of the scans, which are reserved for trigger frequencies, for the actual trigger cell. This is explained in the following example.

It is assumed that six different frequencies would be required for the trigger cells in the vicinity of the serving cell, which is already a high number. Of the 24 scans for trigger cells in 120 ms, there are therefore 24/6=3 scans per trigger frequency in 120 ms. This number is too low to permit the production of a reliable determination as to the availability of a trigger cell. However, it is sufficient for an approximate forecast. If the mobile station discovers a noticeable field intensity, which is true when it approaches region 2 for example, it can then give this cell priority in order to reliably determine the field intensity. To that end, the MS does not scan the six frequencies uniformly, but gives them priority corresponding to their field intensity. Of the 24 scans in 120 ms, the strongest cell receives 10 for example, the second strongest six, and the remaining six scans are distributed to the weakest four cells.

If the trigger cell is received with a very high level, then the mobile station could forgo the scanning of adjacent GSM cells in favor of the trigger cell because a hand-over is not absolutely necessary in the short distance of less than 50 m. The number of required frequencies is only indirectly related to the number of trigger cells, it primarily depends upon the planning of the radio network. In the best case, only one frequency is required for all trigger cells.

If the mobile station has found a sufficient field intensity on the trigger frequency, for example the field intensity P1 (FIG. 3), then it seeks the frequency correction burst FB that is transmitted in the time slot 0 in the GSM. The FB permits synchronization. In order to be able to find the FB with a single reading, it is transmitted every 9.23 ns (FIG. 6.3).

Figure 11:
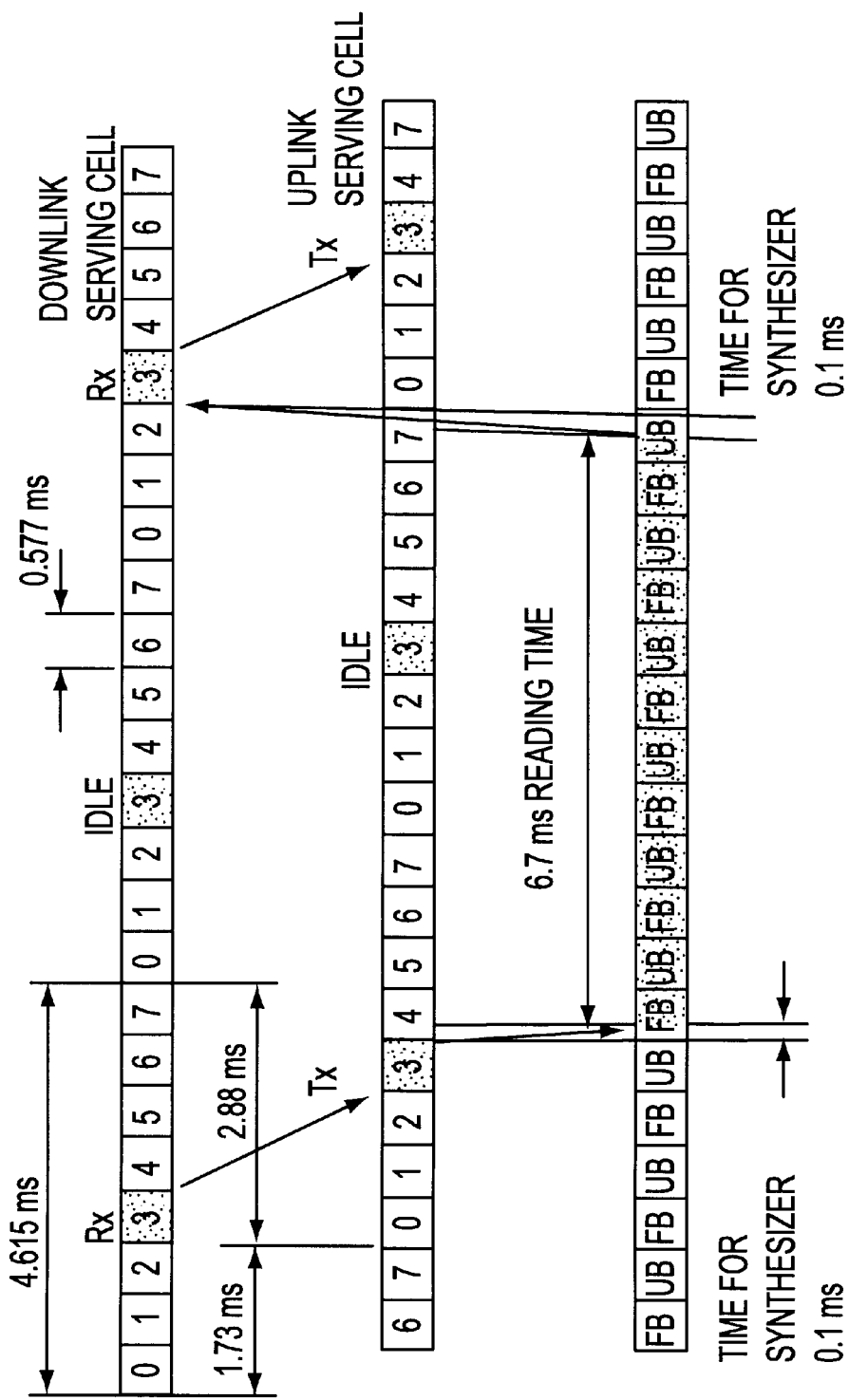
FIG. 11 is a diagram to explain the reception of the signals of the trigger cell while the mobile station is in idle mode.

The UB is transmitted precisely as often as the FB and with the selected channel structure, can be read at the same time as the FB. FIG. 11 shows the case in which the synchronization and the reading of the UB occurs during the idle time slot. The idle time slot in which the mobile station has time to read other than its own cell appears every 120 ms. The mobile station can read in and evaluate a signal of up to 6.7 ms duration. However, less than half of the signal duration is sufficient. In 2.9 ms, at least four bursts of 0.577 ms each can be completely read in. As a result, at least two FB and two UB are ready for evaluation with the selected signal structure according to FIG. 6.3. With the high field intensity and the direct visibility between the transmission antenna and the reception antenna, in all probability, one FB and one UB are sufficient to decode the trigger signal.

Figure 12:
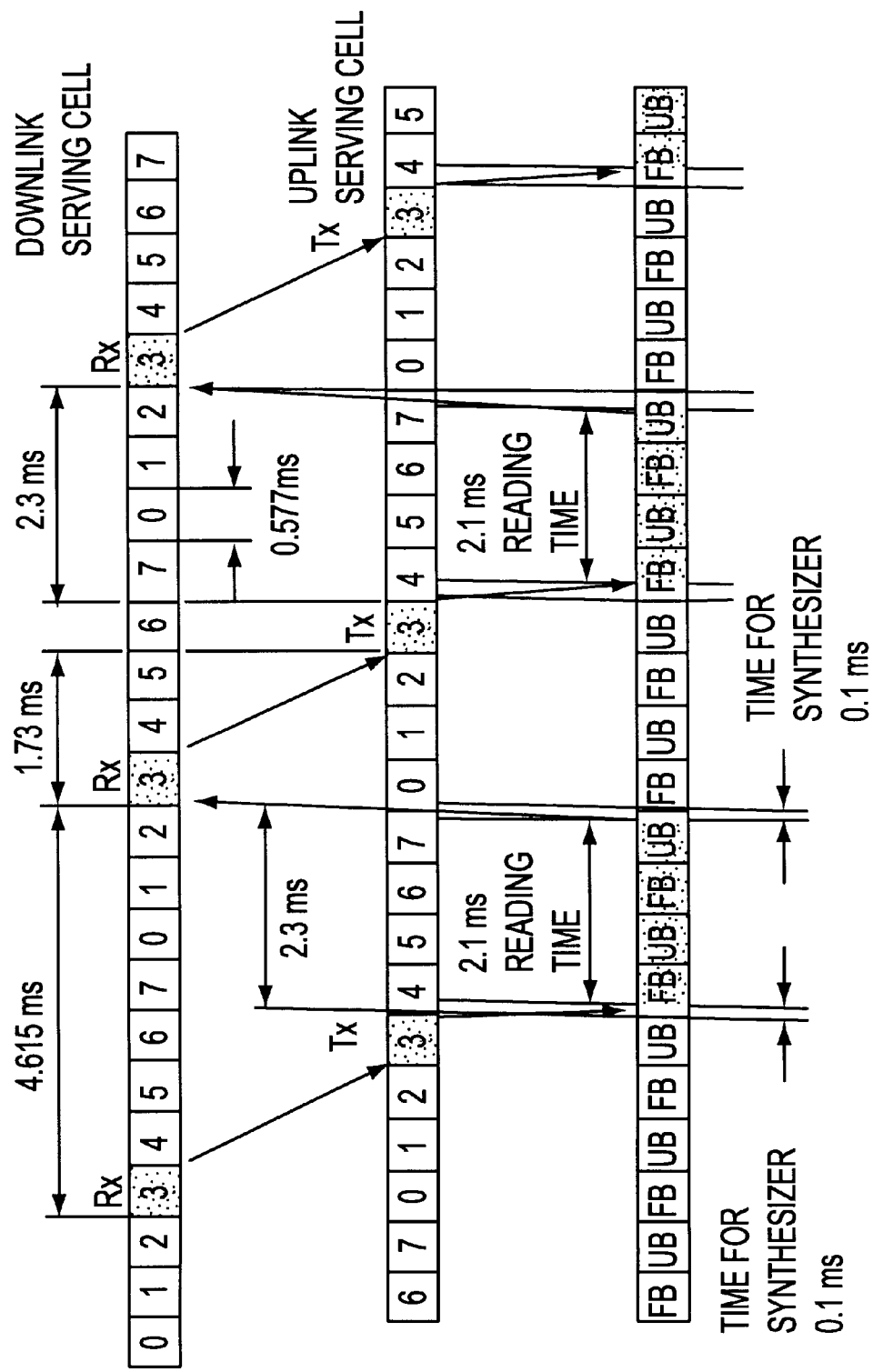
FIG. 12 is a diagram to explain the reception of the signals of the trigger cell during a connection of the mobile station to the base station of the GSM network.

FIG. 12 shows the synchronization and reading of the UB during a connection of the mobile station to the serving cell, i.e. in connected mode. In the pause between transmitting Tx and receiving Rx, the FB and UB can be reliably received. In this way, the mobile station can read the trigger signal in less than 50 ms. As shown, the mobile station can reliably decode the trigger cell within 120 ms.

Size of the Trigger Cell

The expanse of the trigger cell is a function of what speed the trigger cell permits being driven through and how fast the mobile station can recognize the trigger cell. The trigger cell must be at least large enough that the duration of time that the mobile station stays in the cell is greater than the time required for detecting the cell. Stay duration=cell size/vehicle speed. If stay duration>recognition time and the cell size is solved for, then:

cell size>recognition time * vehicle speed.

Let it be assumed that the maximum vehicle speed is 250 km/h (=70 m/s). The size for regions 2 and 3 (FIG. 3) must be separately determined.

Inside region 3, the mobile station must reliably recognize the field intensity P2. The field intensity measurement takes an estimated 100 ms. The speed of 250 km/h results in a 7 m size for region 3.

Inside region 2, the mobile station has to reliably recognize the field intensity P1 and read the underlay broadcast channel UBCH. The field intensity measurement at the transition from region 1 to region 2 takes an estimated 240 ms of averaging time and the reading of the UBCH takes an additional 120 ms. Thus the time required is 360 ms. In addition, region P2 is contained in region P1 and the time of 100 ms must be added on to the 360 ms. For region P1,

| cell recognition time | 240 ms = | 17 m |
|---|---|---|
| UBCH reading time | 120 ms = | 9 m |
| time for region 3 | 100 ms = | 7 m |
| total | 460 ms = | 33 m |

Thus 33 m is sufficient for region 2, where the size is not critical because the toll debit is not triggered in this region. It can be enlarged without hesitation.

We claim:

1. A process for locating mobile stations in a cellular mobile radio network, the network including a plurality of radio cells in which each radio cell is supplied by at least one base station, the mobile stations, in addition to functions within the mobile radio network, evaluating signals from transmitters for position determination of the mobile stations, and each transmitter is assigned to a locally defined underlay broadcast cell located within at least one of the radio cells, the process comprising:

emitting first information about an underlay broadcast cell from the at least one base station of one of the plurality of radio cells in which the respective underlay broadcast cell is located;

emitting second information about the underlay broadcast cell from the transmitter assigned to the underlay broadcast cell;

receiving, at the mobile stations, the first and second information;

comparing, at the mobile stations, the first and second information received from the base station and the transmitter of the underlay broadcast cell; and determining a position of the mobile stations with the first and second information when the first information corresponds with the second information.

2. The process according to claim 1, the locally defined underlay broadcast cells are trigger cells, wherein when using a broadcast process, the mobile radio network communicates the frequencies of the trigger cells to the mobile stations.

3. The process according to claim 1, the locally defined broadcast cells are trigger cells, wherein relevant field intensity level(s) for the trigger cell(s) are communicated by the mobile radio network using a broadcast process.

4. The process according to claim 1, the position determining comprising evaluating a field intensity of underlay broadcast cell at the mobile stations.

5. The process according to claim 4, wherein the mobile stations can distinguish between at least two field intensity levels of the trigger cell.

6. The process according to claim 4, further comprising regularly scanning, at the mobile stations, the frequencies of trigger cells and more frequently scanning one of the frequencies when a receiver input level exceeds a first predetermined field intensity level.

7. The process according to claim 4, further comprising regularly scanning, at the mobile stations, the frequencies of trigger cells and evaluating the data received when the receiver input level exceeds a predetermined field intensity level.

8. The process according to claim 7, further comprising associating results of the evaluation of signals of a number of transmitters of the trigger cells with one another.

9. The process according to claim 4, emitting signals from the transmitters of the trigger cells that are composed of individual bursts which correspond to bursts utilized in GSM transmission.

10. The process according to claim 9, further comprising transmitting alternating frequency correction bursts and data bursts.

11. The process according to claim 1, wherein each locally defined underlay broadcast cell is a trigger cell, and wherein the signals emitted by the transmitters of the trigger cells contain identification information of a corresponding charging point for the charging of a toll.

12. The process according to claim 11, wherein the signals of the transmitters each contain a piece of data that indicates whether a monitoring of the toll charging occurs at the respective charging-point.

13. The process according to claim 11, further comprising forming at least one charging point for highway usage fees with a number of the trigger cells, wherein signals emitted by the transmitters of each trigger cell include a number related to an affiliation with a respective charging point.

14. A system for locating mobile stations in a cellular mobile radio network comprising:

a plurality of radio cells in which each radio cell is supplied by at least one base station;

a plurality of transmitters in which each of the plurality of transmitters is associated with a locally defined underlay broadcast cell located within at least one of the plurality of radio cells;

the at least one base station adapted to emit first information about the underlay broadcast cell located within its respective radio cell;

the transmitter adapted to emit second information about the underlay broadcast cell with which it is associated;

the mobile stations adapted to receive the first and second information;

information comparing units associated with each mobile station that compares the first and second information received from the at least one base station and the transmitter associated with the underlay broadcast cell; and a position determination device adapted to determine the position of the mobile station from the first and second information when the first information corresponds with the second information.

15. The system according to claim 14, wherein the locally defined underlay broadcast cell is a trigger cell and wherein transmitters of two trigger cells positioned on different sides of the highway form a charging point.

16. The system according to claim 14, wherein the one transmitter is coupled to a send/receive device that corresponds functionally with a mobile station within the mobile network and that transmits data to and from a service and operation device.

* * * * *